(12) United States Patent
Tanaka et al.

(10) Patent No.: US 7,483,014 B2
(45) Date of Patent: Jan. 27, 2009

(54) DISPLAY METHOD FOR DISPLAY APPARATUS

(75) Inventors: Masanobu Tanaka, Kanagawa (JP); Ryota Odake, Tokyo (JP); Kenichi Takahashi, Kanagawa (JP)

(73) Assignee: Sony Corporation, Tokyo (JP)

( * ) Notice: Subject to any disclaimer, the term of this patent is extended or adjusted under 35 U.S.C. 154(b) by 199 days.

(21) Appl. No.: 10/514,741

(22) PCT Filed: May 16, 2003

(86) PCT No.: PCT/JP03/06154

§ 371 (c)(1),
(2), (4) Date: Jun. 27, 2005

(87) PCT Pub. No.: WO03/098340

PCT Pub. Date: Nov. 27, 2003

(65) Prior Publication Data

US 2006/0038799 A1 Feb. 23, 2006

(30) Foreign Application Priority Data

May 20, 2002 (JP) ............................. 2002-144450

(51) Int. Cl.
*G09G 3/38* (2006.01)
(52) U.S. Cl. ..................................................... 345/105
(58) Field of Classification Search ................. 345/204, 345/105

See application file for complete search history.

(56) References Cited

U.S. PATENT DOCUMENTS

| | | | | |
|---|---|---|---|---|
| 5,280,278 A | * | 1/1994 | Vick | ............................ 345/76 |
| 6,287,485 B1 | * | 9/2001 | Akashi et al. | ............... 252/583 |
| 2002/0196526 A1 | * | 12/2002 | Kawai et al. | ................ 359/296 |
| 2003/0034939 A1 | * | 2/2003 | Moon | ........................... 345/76 |

FOREIGN PATENT DOCUMENTS

| | | |
|---|---|---|
| JP | 55-115085 | 9/1980 |
| JP | 62-71934 | 4/1987 |
| JP | 3-18830 | 1/1991 |

* cited by examiner

*Primary Examiner*—Yong Sim
(74) *Attorney, Agent, or Firm*—Robert J. Depke; Rockey, Depke & Lyons, LLC.

(57) ABSTRACT

A method of driving a display apparatus with which unevenness of image is precluded and the time for display is shortened. A display apparatus for displaying an image by impressing a voltage on pixels by row electrodes and column electrodes disposed in a matrix, for example, a metal deposition type electrochemical display apparatus. A voltage not less than a threshold voltage $V_{th}$ is selectively impressed on predetermined pixels by superposing an address pulse voltage $V_{adress-row}$ for the row electrodes and an address voltage $V_{adress-col}$ for the column electrodes on each other to thereby perform address driving, and a data sustaining pulse voltage $V_{sus}$ is impressed on the row electrodes immediately after the address pulse voltage $V_{adress-row}$. The data sustaining pulse voltage $V_{sus}$ satisfies the condition of the following formula:

$$V_{sus}+V_{adress-col}<V_{th} \qquad (1).$$

11 Claims, 16 Drawing Sheets

F I G. 1 2
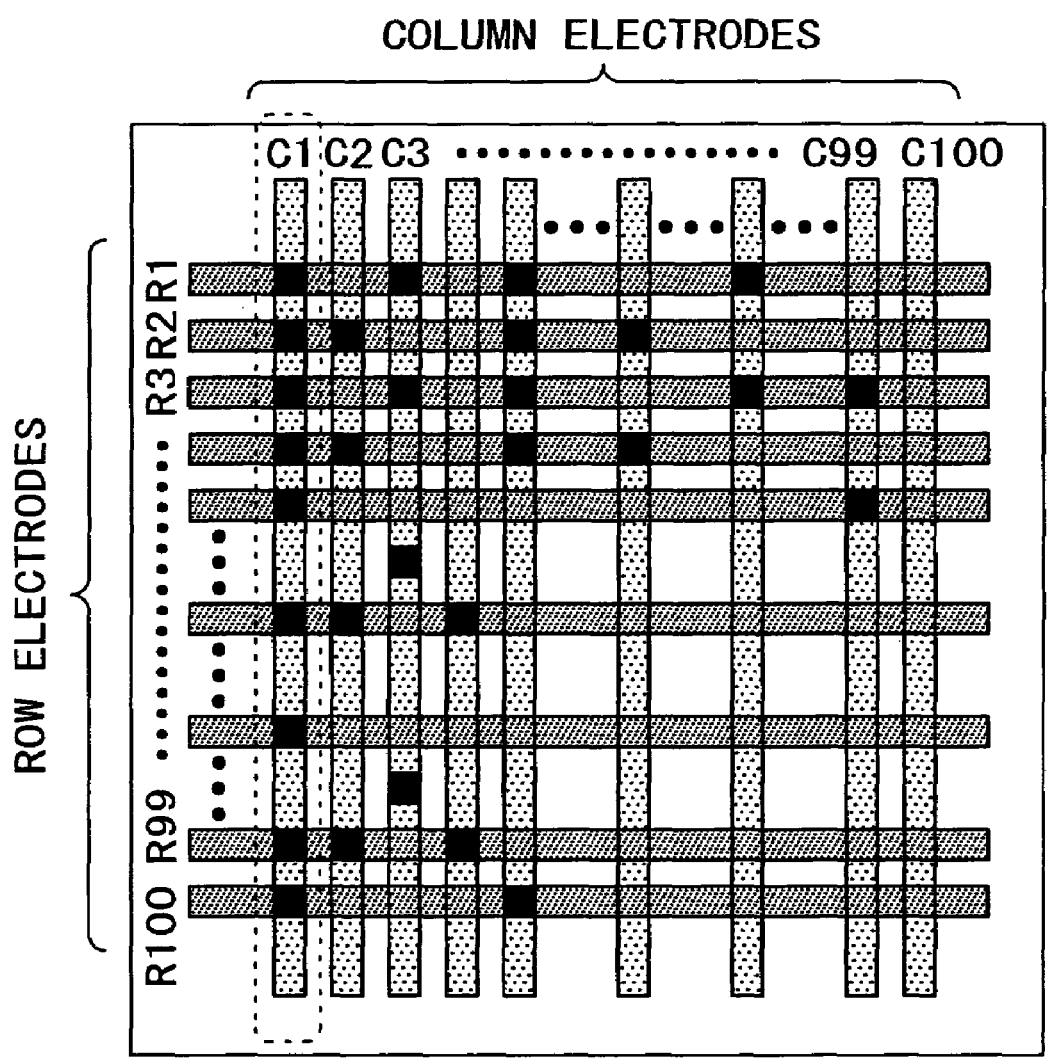

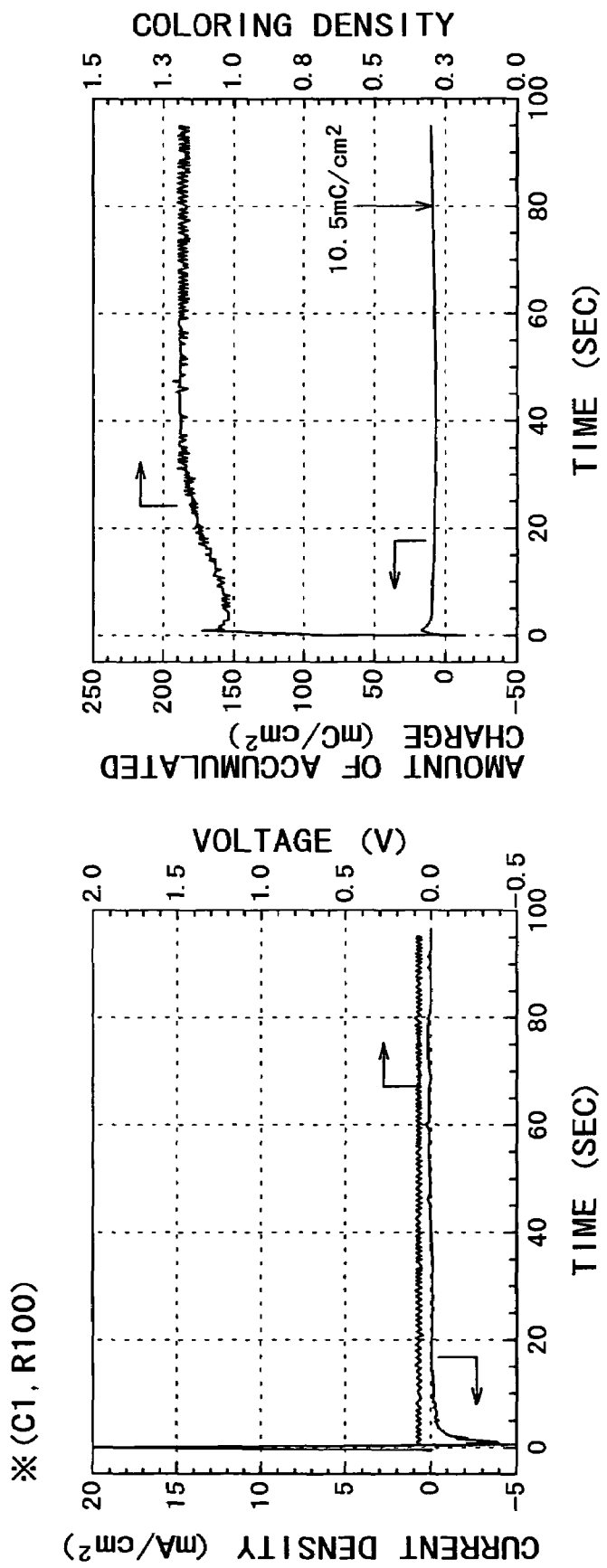

DISPLAY METHOD FOR DISPLAY APPARATUS

This application is a 371 of PCT/JP03/06154 May 16, 2003.

This application claims priority to Japanese Patent Application Number JP2002-144450, filed May 20, 2002 which is incorporated herein by reference.

TECHNICAL FIELD

The present invention relates to a driving method suitable for application to, for example, an electrodeposition type display apparatus for displaying images by deposition and dissolution of a metal, and particularly to a driving method for a simple matrix type display apparatus for driving by row electrodes and column electrodes which are arranged in a matrix.

BACKGROUND ART

In recent years, attendant on the spread of networks, documents hitherto distribution in the form of printed matter have come to be transmitted in the form of electronic documents. Further, books and magazines have come to be often provided in the form of the so-called electronic publishing. In order to read these pieces of information, reading from CRTs (cathode ray tubes) and liquid crystal displays of computers has conventionally been widely conducted.

However, in a light emission type display such as the CRT, it has been pointed out that the display causes conspicuous wearing on an ergonomic ground and, therefore, is unsuited to long-time reading. In addition, even a light reception type display such as a liquid crystal display is said to be similarly unsuited to reading, because of the flickering which is intrinsic of fluorescent tubes. Furthermore, both of the types have the problem that the reading place is limited to the places where computers are disposed.

In recent years, reflection type liquid crystal displays not using a backlight have put to practical use. However, the reflectance in non-display (display of white color) of the liquid crystal is 30 to 40%, which means a considerably bad visibility, as compared with the reflectance of printed matter printed on papers (the reflectance of OA papers and pocket books is 75%, and the reflectance of newspapers is 52%). In addition, the glaring due to reflectors and the like are liable to cause wearing, which also is unsuited to long-time reading.

In order to solve these problems, the so-called paper-like displays and the so-called electronic papers have been being developed. The media mainly utilize coloration by moving colored particles between electrodes through electrophoresis or by rotating dichroic particles in an electric field. In these methods, however, the gaps between the particles absorb light, with the result that contrast is worsened and that a practical-use writing speed (within one sec) cannot be obtained unless the driving voltage is 100 V or higher.

As compared with the displays of these systems, electrochemical display devices for color development based on an electrochemical action (electrochromic display: ECD) is better in contrast, and they have already been put to practical use as light control glass or timepiece displays. It should be noted here that the light control glass and timepiece displays are not directly suited to the electronic paper or the like uses, since it is intrinsically unnecessary to perform matrix driving. Besides, they are generally poor in quality of black color, and the reflectance thereof remains at a low level.

In addition, in such displays as electronic papers, they are continuedly exposed to solar light or room light on a use basis, and, in an electrochemical display device put to practical use in the light control glass and timepiece displays, an organic material is used for forming black-colored portion, which leads to a problem concerning light resistance. In general, organic materials are poor in light resistance, and the black color concentration thereof is lowered through fading when used for a long time.

In order to solve these technical problems, there has been proposed an electrochemical display device using metal ions as a material for color change. In the electrochemical display device, the metal ions are preliminarily mixed into a polymer electrolyte layer, the metal is deposited and dissolved by electrochemical redox reactions, and the change in color attendant on this is utilized to perform display. Here, for example, when the polymer electrolyte layer contains a coloring material, it is possible to enhance the contrast in the case where the color change occurs.

Meanwhile, in the metal deposition type electrochemical display device based on deposition and dissolution of the metal, a threshold voltage which is the deposition overvoltage is utilized to achieve display. In each pixel, the metal is deposited when a minus voltage in excess of the threshold voltage is impressed between electrodes arranged in a matrix form, whereas the metal is dissolved when a plus voltage is impressed between the electrodes.

When it is tried to drive a display apparatus based on a simple matrix system by utilizing the threshold voltage, the degree of coloration of the pixel would vary according to the sequence of selection.

For example, where display as shown in FIG. 19 is conducted by use of row electrodes and column electrodes which are arranged in a matrix, the impression of the voltage on the electrodes is performed following a time sequence as shown in FIG. 20A. Specifically, while a scan pulse voltage is impressed sequentially on the row electrodes, a data pulse voltage is impressed on the column electrodes only at the time of coloration. As a result, a voltage (scan pulse voltage+data pulse voltage) in excess of the threshold voltage is impressed on selected pixels to cause coloration (deposition of metal), and only the scan pulse voltage is impressed on non-selected pixels, so that metal deposition does not occur in the non-selected pixels, and non-colored state is maintained there.

In this case, the driving is conducted on a line sequence basis, and there has been confirmed a phenomenon in which the degree of coloration in the pixels arranged on a common column electrode becomes gradually deeper according to the sequence of selection. This is due to the following. In the pixel in which the coloration (deposition of silver) has once occurred, a tiny current flows and the coloration proceeds even where a voltage below the threshold voltage is impressed. Therefore, as is clear from an example of current waveform in FIG. 20B, the scan pulse voltage is impressed on the previously colored pixel, and a current flows there, also at the time of coloration in the subsequent pixel. For example, in a pixel ($R_1$, $C_3$), after the selection period for writing by impressing the scan pulse voltage at a row electrode $R_1$, the data pulse voltage is impressed on a column electrode $C_3$ also during the selection periods of the row electrodes $R_2$ and $R_3$. Similarly, in a pixel ($R_2$, $C_3$), after the selection period for writing by impressing the scan pulse voltage is impressed on the row electrode $R_2$, the data pulse voltage for the column electrode $C_3$ is impressed during the selection period of the row electrode $R_3$. When the threshold voltage is once exceeded, the impression of only these data pulse voltages causes a current to flow and causes the coloration (deposition of metal) to proceed.

Thus, the pixel selected in the beginning stage of image rewriting undergoes writing repeatedly, dependent on the data for the following pixels. As a result, the substantial writing time is elongated according to the sequence of scanning, so that the writing concentration would be enhanced more than required.

In addition, in the conventional driving method as above, the metal such as silver must be deposited stably at the time of coloration, so that the voltage must be impressed over a certain period. Where the silver deposition characteristic of the panel is not uniform, the addressing time must be conditioned to accord to the pixel which is the worst in the characteristic. Therefore, the addressing period is elongated, and the image rewriting time would be increased.

The present invention has been proposed for the purpose of solving these problems. Accordingly, it is an object of the present invention to provide a method of driving a display apparatus with which it is possible to moderate the non-evenness of pixels formed, and to shorten the time for rewriting the image display.

DISCLOSURE OF INVENTION

In order to attain the above object, according to the present invention, there is provided a method of driving a display apparatus for displaying an image by impressing a voltage on pixels by row electrodes and column electrodes which are disposed in a matrix, wherein a voltage not less than a threshold voltage $V_{th}$ is selectively impressed on predetermined pixels by superposing an address pulse voltage $V_{adress-row}$ for said row electrodes and an address voltage $V_{adress-col}$ for said column electrodes on each other to thereby perform address driving, and a data sustaining pulse voltage $V_{sus}$ satisfying the relationship of the following formula (1):

$$V_{sus}+V_{adress-col}<V_{th} \quad (1)$$

is impressed on the row electrodes immediately after the address pulse voltage $V_{adress-row}$.

For example, in a metal deposition type display apparatus, when a voltage of not less than the threshold voltage $V_{th}$ is impressed on pixels by superposing the address pulse voltage $V_{adress-row}$ for the row electrode and the address pulse voltage $V_{adress-col}$ for the column electrodes is impressed on pixels, deposition of the metal starts, and nuclei of crystals are formed. When a data sustaining pulse voltage $V_{sus}$ is impressed subsequently to this, the deposition of the metal proceeds, and the amount of the metal (e.g., silver) deposited in the colored pixels is controlled by the data sustaining pulse voltage $V_{sus}$ independently from the address driving. The address driving requires only the formation of the nuclei of the metal, and it is possible to reduce the address pulse voltage which would cause non-evenness of writing, and to shorten the selection period.

BRIEF DESCRIPTION OF DRAWINGS

FIG. 12 is a general plan view showing one example of 100 lines×100 lines display apparatus.

FIG. 16A is a characteristic diagram showing current and voltage values against time, and FIG. 16B is a characteristic diagram showing the amount of accumulated electric charge and coloration density against time, in a pixel ($R_{100}$, $C_{100}$) in the case where the driving method according to the related art shown in FIG. 13 is adopted.

FIGS. 20A and 20B are waveform diagrams showing one example of a driving voltage waveform in a conventional driving method, in which FIG. 20A is a waveform diagram showing a driving sequence, and FIG. 20B is a waveform diagram showing a voltage and a current (on row electrode basis) impressed on pixels ($R_1$, $C_3$), ($R_2$, $C_3$), ($R_3$, $C_3$).

BEST MODE FOR CARRYING OUT THE INVENTION

Figure 1:
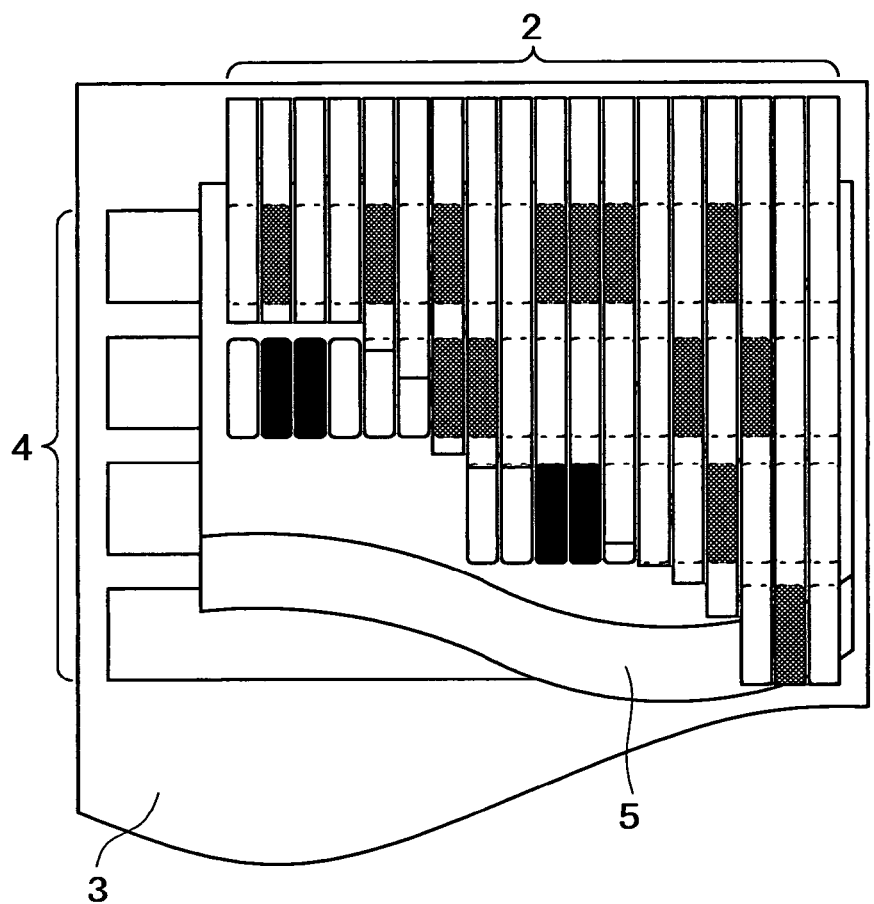
FIG. 1 is a general plan view showing, partly in a broken state, one example of an electrodeposition type display apparatus.

Now, the method of driving a display apparatus according to the present invention will be described in detail below referring to the drawings.

Prior to description of the driving method, an example of the configuration of a metal deposition type electrochemical display apparatus suitable for application of the present invention will be described.

The display apparatus in this example is an electrochemical display apparatus for performing display by deposition and dissolution of a metal through utilizing electrodeposition characteristics and is driven by a simple matrix driving method. Therefore, driving electrodes are composed of a first electrode group $X_1$, $X_2$, . . . and a second electrode group $Y_1$, $Y_2$, . . . orthogonal thereto, which are arranged to intersect each other in a lattice form.

Figure 2:
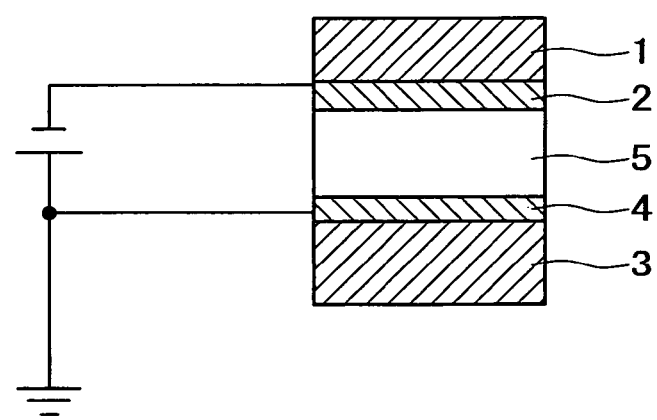
FIG. 2 is a general sectional view showing one example of the electrodeposition type display apparatus.
Figure 3:
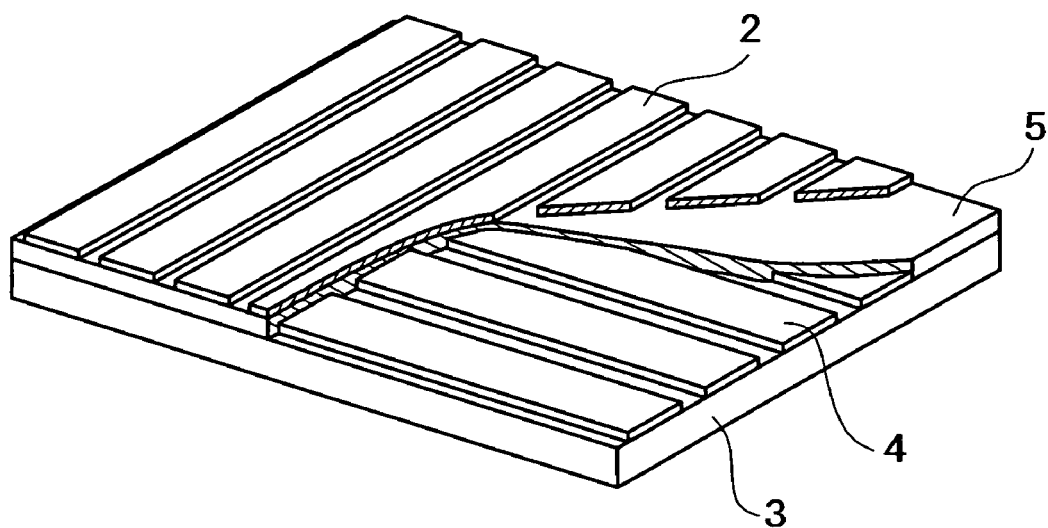
FIG. 3 is a general perspective view showing, partly in a broken state, a part of the electrodeposition type display apparatus.

FIGS. 1 to 3 show a specific structure of the driving electrodes, in which stripe-form transparent column electrodes 2 corresponding to the first electrode group are formed on a transparent substrate 1. In addition, a base substrate 3 provided with stripe-form counter electrodes (row electrodes) 4 corresponding to the second electrode group is disposed opposite to the transparent substrate 1, and the substrates are laminated with a polymer electrolyte layer 5 therebetween. The transparent column electrodes 2 and the row electrodes 4 are provided in predetermined numbers according to the number of pixels, and their intersections constitute the pixels.

In the above configuration, for the transparent substrate 1, there can be used transparent glass substrates such as a quartz glass plate, a white sheet glass plate and the like, but they are not limitative. Examples of the material usable for the transparent substrate 1 include esters such as polyethylene naphthalate and polyethylene terephthalate, polyamides, polycarbonate, cellulose esters such as cellulose acetate, fluoropolymers such as polyvinylidene fluoride and tetrafluoroethylene-hexafluoropropylene compolymer, polyethers such as polyoxymethylene, polyacetals, polystyrene, polyolefins such as polyethylene, polypropylene and methylpentene polymer, and polyimides such as polyimide-amides and polyether imides. Where these synthetic resins are used as a support, they can be used as rigid substrates which are not bent easily, and they can be used as film-form substrates having flexibility.

As the transparent column electrode 2, there can be used, for example, a mixture of $In_2O_3$ and $SnO_2$, i.e., so-called ITO film, and films coated with $SnO_2$- or $In_2O_3$. The ITO film and the $SnO_2$- or $In_2O_3$-coated film may be doped with Sn or Sb, and MgO, ZnO and the like can also be used.

On the other hand, examples of a matrix (base material) polymer which can be used for the polymer electrolyte layer 5 include polyethylene oxide, polyethyleneimine, and polyethylene sulfide having skeleton units represented by —(C—C—O)$_n$—, —(C—C—N)$_n$—, and —(C—C—S)$_n$—, respectively. These skeleton units serves as main chain structures, which may be provided with branches. In addition, polymethyl methacrylate, polvinylidene fluoride, polyvinylidene chloride, polycarbonate and the like are also preferable.

In forming the polymer electrolyte layer 5, a required plasticizer is preferably added to the matrix polymer. Preferable examples of the plasticizer in the case where the matrix polymer is hydrophilic include water, ethyl alcohol, isopropyl alcohol and mixtures thereof. On the other hand, preferable examples of the plasticizer in the case where the matrix polymer is hydrophobic include propylene carbonate, dimethyl carbonate, ethylene carbonate, y-buryrolactone, acetonitrile, sulfolan, dimethoxyethane, ethyl alcohol, isopropyl alcohol, dimethyl formamide, dimethyl sulfoxide, dimethyl acetamide, n-methylpyrrolidone and mixtures thereof.

The polymer electrolyte layer 5 is formed by dissolving an electrolyte in the matrix polymer. Examples of the electrolyte include not only metallic salts functioning as a color forming material for display but also quaternary ammonium halides (F, Cl, Br, I), alkali metal halides (LiCl, LiBr, LiI, NaCl, NaBr, NaI, etc.), alkali metal cyanides, and alkali metal thiocyanides, and a material containing at least one support electrolyte selected therefrom is dissolved as an electrolyte. Here, examples of the metallic ion constituting the metallic salt functioning as a color forming material for display include bismuth, copper, silver, lithium, iron, chromium, nickel, and cadmium, which may be used singly or in combination. As the metallic salt, arbitrary salts of these metals may be used. Where the metal is silver, the examples of the metallic salt include silver nitrate, silver borofluoride, silver halides, silver perchlorate, silver cyanide, silver thiocyanide, etc.

Besides, a colorant may be added to the polymer electrolyte layer 5 in order to enhance contrast. Where the coloration by deposition of the metal is black, the background color is preferably white, and a white material high in hiding property is preferably used as the colorant. As such a material, white particles for coloring may be used; examples of the white particles for coloring include titanium dioxide, calcium carbonate, silica, magnesium oxide and aluminum oxide.

In this case, the ratio in which the white pigment is mixes, in the case of inorganic particles, is preferably about 1 to 20 wt. %, more preferably about 1 to 10 wt. %, and further preferably about 5 to 10 wt. %. The reason for the restriction to within such a range of ratio is that the white pigment such as titanium oxide is not soluble but dispersible in the polymer, and, when the mixing ratio is increased, the white pigment will coagulate, with the result that the optical density is non-uniform. Besides, the white pigment lacks ionic conductivity, so that an increase in the mixing ratio leads to a lowering of the conductivity of the polymer electrolyte. Considering both the above points, the upper limit of the mixing ratio is about 20 wt. %.

Where the inorganic particles are mixed into the polymer electrolyte layer 5 as a colorant as above-mentioned, the thickness of the polymer electrolyte layer 5 is preferably 10 to 200 μm, more preferably 10 to 100 μm, and further preferably 10 to 50 μm. As the polymer electrolyte layer 5 is thinner, the resistance between electrodes is lower, which preferably leads to a shortening of coloration and decoloration times and a reduction in electric power consumption. However, when the thickness of the polymer electrolyte layer 5 is less than 10 μm, mechanical strength is lowered, leading to such inconveniences as generation of pinholes or cracks. On the other hand, when the thickness of the polymer electrolyte layer 5 is too small, the mixing amount of the inorganic particles is small, and the whiteness (optical density) may be insufficient.

Incidentally, where a coloring matter is used as the coloring material mixed in the polymer electrolyte layer 5, the mixing ratio of the coloring material may be 10 wt. % or below. This is because the coloring efficiency of the coloring matter is much higher than that of the inorganic particles. Therefore, an electrochemically stable coloring matter can provide a sufficient contrast even when used in a small amount. As such a coloring matter, for example, oil-soluble dyes are preferably used.

The base substrate 3 provided on the back side may not necessarily be transparent, and any substrate, film or the like that can securely hold the row electrodes 4 can be used. Examples of the usable material include glass substrates such as quartz glass plates and while sheet glass plates, ceramic substrates, paper substrates, and wood substrates. Naturally, the usable material is not limited to these materials, and synthetic resin substrates and the like can also be used. Examples of the material of the synthetic resin substrates include esters such as polyethylene naphthalate and polyethylene terephthalate, polyamides, polycarbonates, cellulose esters such as cellulose acetate, fluoro-polymers such as polyvinylidene fluoride and tetrafluoroethylene-cohexafluoropropylene, polyethers such as polyoxyethylene, polyacetal, polystyrne, polyolefins such as polyethylene, polypropylene and methylpentene polymer, and polyimides such as polyimide-amides and polyether imides. Where these synthetic resins are used for the base substrate, they can be used as rigid substrates which it not bent easily, but they can also be used as film-form substrates having flexibility.

For the row electrodes 4, there can be used conductive materials, for example, metallic materials. It should be noted here that where the potential difference between the metal constituting the row electrodes 4 and the metal to be deposited on the transparent column electrodes 2 is large, electric charges are accumulated on the electrodes in the colored state, and the migration of the electric charges occur, which may result in unintended coloring of pixels. Particularly, when the potential difference exceeds the deposition overvoltage at the time of deposition (threshold value in simple matrix driving), there is the possibility of the coloring. Therefore, for the row electrodes 4, it is desirable to select a metal such that the potential difference between itself and the metal to be deposited as the coloring material is less than the deposition over-voltage (threshold value). Ideally, as the metallic material constituting the row electrodes 4, there is used a material in the state before ionization of the metal ions used for the coloring material (in the metallic state). Namely, the same metal as the metal to be deposited and dissolved is used for the row electrodes 4, as, for example, silver is used for the row electrodes 4 where the deposition and dissolution of silver are utilized. This ensures that the above-mentioned potential difference will not occur in the condition where the metal is deposited on the transparent column electrodes 2.

The configuration of the display apparatus utilizing the electrodeposition characteristics is as above-described. Next, a method of driving the display apparatus will be described.

Figure 4:
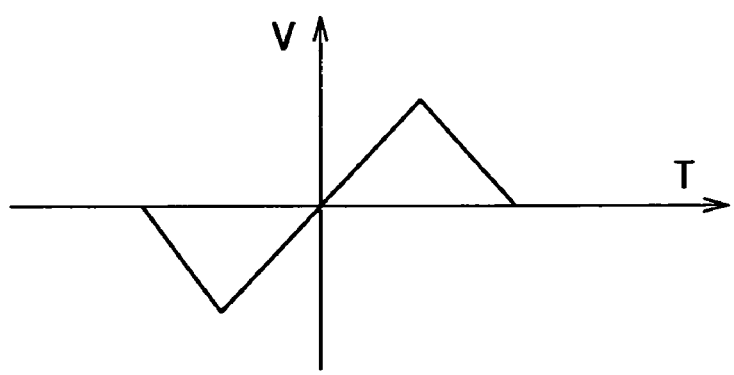
FIG. 4 is a waveform diagram showing a triangular wave voltage impressed for examining current-voltage transient response characteristic.
Figure 5:
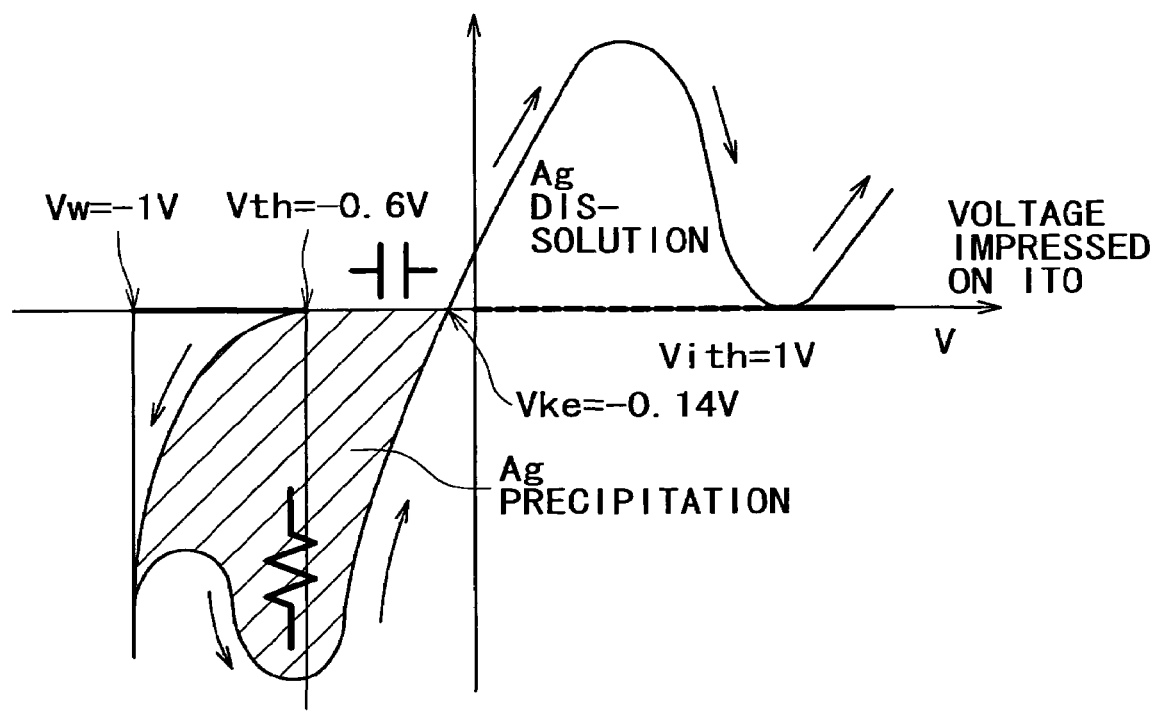
FIG. 5 is a characteristic diagram showing the current-voltage transient response characteristic in a metal deposition type electrochemical display apparatus.

In the display apparatus utilizing the electrodeposition characteristics, where a triangular wave voltage as shown in FIG. 4, for example, is impressed between the column electrode and the row electrode, a current-voltage transient response characteristic shown in FIG. 5 is obtained. Incidentally, FIG. 5 shows an example of characteristics in the case where the row electrodes are Ag electrodes and silver ions and iodide ions are dissolved in the polymer electrolyte.

Referring to FIG. 5, as a voltage ranging from zero to the minus side is impressed between the column electrode and the row electrode, non-deposition of silver is kept for a while, and deposition of silver onto the column electrode begins when the impressed voltage exceeds a threshold voltage $V_{th}$. It is seen from FIG. 5 that a current attendant on the deposition starts to flow when the voltage exceeds the threshold voltage $V_{th}$. Thus, each pixel has a characteristic such that a characteristic as a capacitor is mainly strong before deposition (white) and the resistance decreases as deposition proceeds (black).

The deposition of silver continues even when the impressed voltage exceeds a writing voltage $V_w$ corresponding to the apex of the triangular wave voltage and is gradually lowered, and the deposition continued even when the impressed is lowered below the threshold voltage $V_{th}$. The deposition of silver ends when the impressed voltage is lowered to a keeping voltage $V_{ke}$. This implies an important finding. Specifically, it was found that when the impressed voltage once exceeds the threshold voltage $V_{th}$ and nuclei (seeds) are formed, the deposition of silver occurs even at a voltage not higher than the threshold voltage $V_{th}$. The present invention makes most of this phenomenon, as will be described later.

On the other hand, when a voltage of opposite polarity (plus) is impressed between the column electrode and the row electrode, dissolution of silver begins, and the deposited silver disappears when the impressed voltage reaches an erasure voltage $V_{ith}$. When a voltage higher than this is impressed, iodine is librated to adhere to the electrodes, whereby the electrodes are colored in yellow.

Figure 20A:
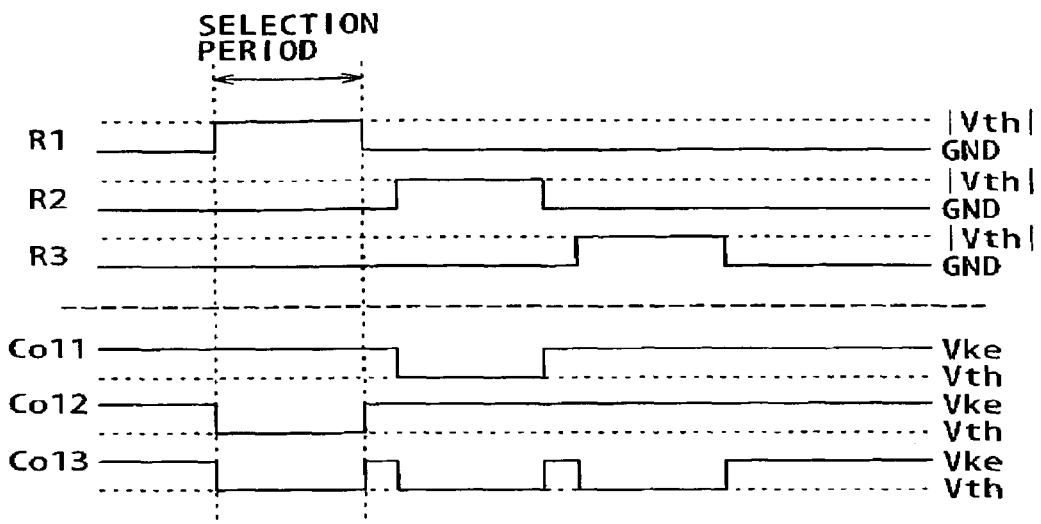
Figure 20B:
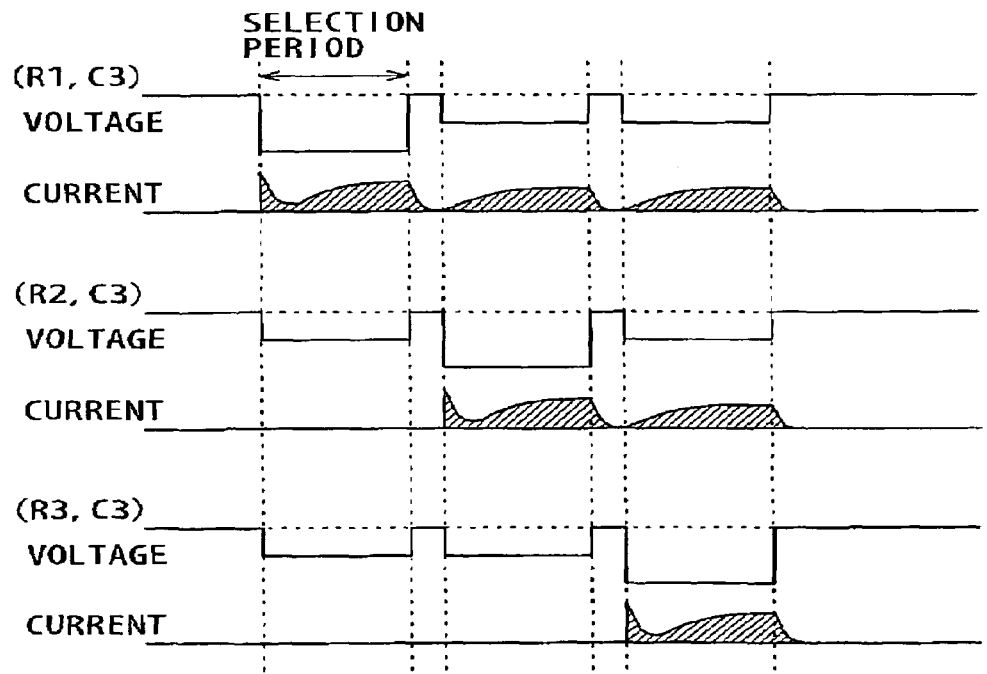

As for the driving of the display apparatus showing the current-voltage transient response characteristic as above, it may be contemplated, most simply, to impress a voltage in excess of the threshold voltage in address driving so as to deposit silver and to write in the pixel, as has been shown in FIG. 20B. However, as has been mentioned above, there occur the problems that the writing density becomes nonuniform and the addressing period is elongated, leading to an increase in the pixel rewriting time.

Figure 6:
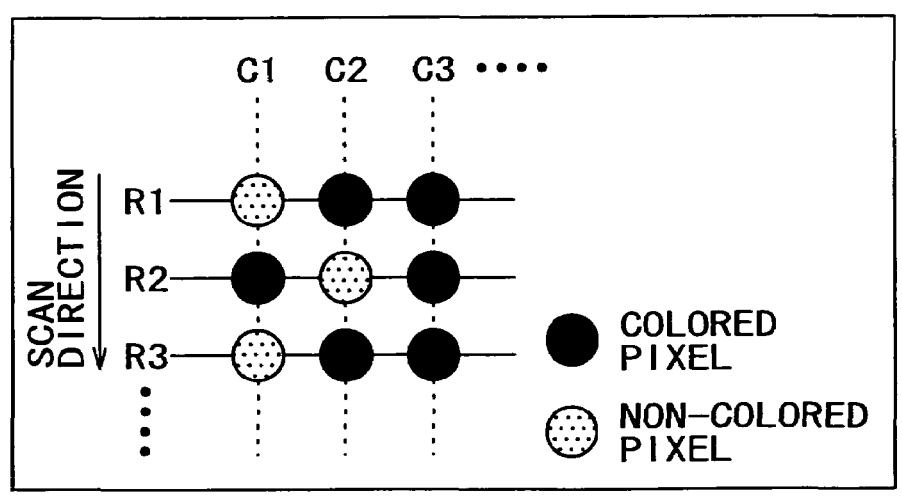
FIG. 6 is a schematic diagram showing one example of monochromic display using 3×3 pixels.

In view of this, in this example, a data sustaining pulse is applied immediately after the data addressing period, whereby the amount of silver deposited on the colored pixels is controlled independently from the address pulse. Now, for simplifying the description, a monochromic display by use of 3×3 pixels shown in FIG. 6 is taken as an example, and the driving voltage waveform in this case will be described.

Figure 7A:
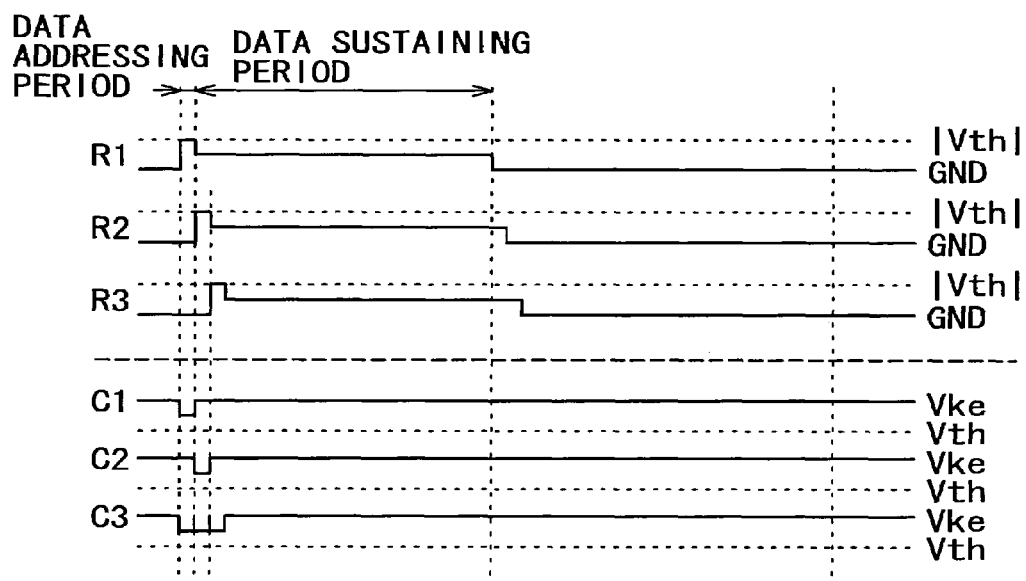
FIGS. 7A and 7B are waveform diagrams showing one example of a driving voltage waveform in a driving method to which the present invention has been applied.
Figure 7B:
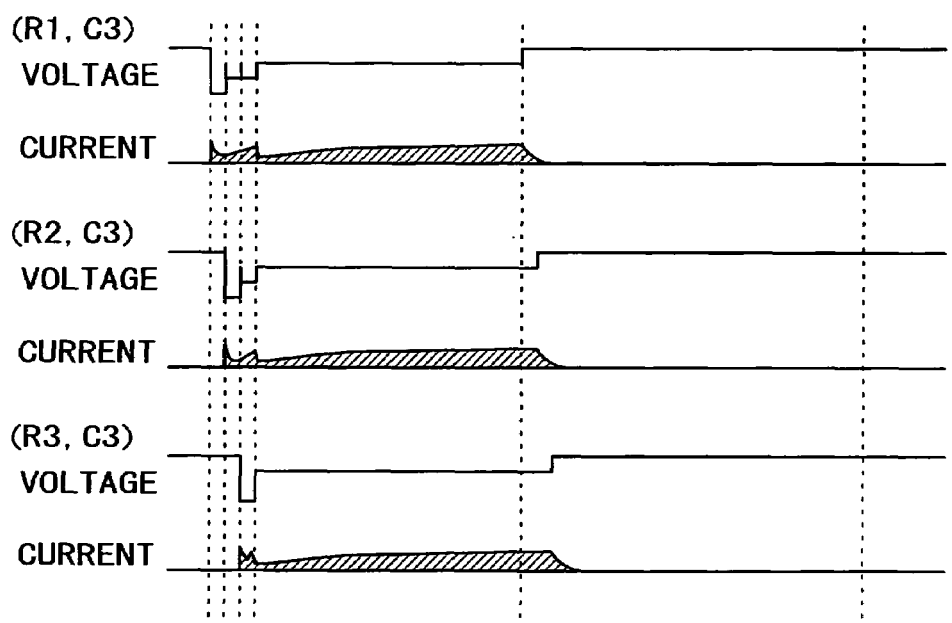

FIGS. 7A and 7B show an example of driving voltage waveform for performing display according to the present invention, in the case of an electrodeposition display device such that silver is deposited on the column electrode when a minus voltage is impressed and the voltage becomes greater than the threshold voltage $V_{th}$ and that silver is dissolved when a plus voltage is impressed. In FIG. 7(B), there are shown a row voltage impressed on each of row electrodes $R_1$, $R_2$, $R_3$, a column voltage impressed on each of column electrodes $C_1$, $C_2$, $C_3$, and a voltage impressed on pixels ($R_1$, $C_3$), ($R_2$, $C_3$), ($R_3$, $C_3$).

At the time of display, an address pulse voltage $V_{adress-row}$ at $|V_{th}|$ is impressed on each of the row electrodes $R_1$, $R_2$, $R_3$, and a signal writing address pulse voltage $V_{adress-col}$ (0 to $V_{th}$) smaller than the threshold voltage $V_{th}$ is impressed on each of the column electrodes $C_1$, $C_2$, $C_3$, whereby the electrodes are selected in a downward order. In this case, a voltage ($V_{adress-row}+V_{adress-col}$: $2\times|V_{th}|$ at maximum) greater than the threshold voltage $V_{th}$ is impressed only on the pixels for silver deposition, whereby silver is deposited on the transparent column electrodes, and nuclei are formed.

For example, at the pixels ($R_1$, $C_3$), ($R_2$, $C_3$), ($R_3$, $C_3$), the address pulse voltage of the column electrode $C_3$ and the address pulse voltage of the row electrodes $R_1$, $R_2$, $R_3$ are superposed on each other, resulting in that a voltage in excess of the threshold voltage is impressed due to the voltage difference, and silver deposition takes place. On the other hand, at the pixel ($R_1$, $C_1$) and the like, there is no period during which the address pulse voltage of the column electrode and the address pulse voltage of the row electrodes is superposed, and only a voltage below the threshold voltage $V_{th}$ is impressed. Therefore, at these pixels, silver deposition does not occur, and nuclei are not formed.

Here, it is unnecessary to complete the writing by the address driving, and it is necessary only to form crystals serving as nuclei, so that the data addressing period for impressing the address pulse voltage $V_{adress\text{-}row}$ and the address pulse voltage $V_{adress\text{-}col}$ can be by far shortened, as compared with the example shown in FIGS. 20A and 20B. Specifically, the data addressing period can be shortened to about 1/10 times the writing time.

After the data addressing period, a data sustaining pulse voltage $V_{sus}$ is impressed on the row electrodes $R_1$, $R_2$, $R_3$, . . . . With the data sustaining pulse voltage $V_{sus}$ impressed, it is possible to control the amount of silver deposited and to uniformize the coloring density at each pixel. When the data sustaining pulse voltage $V_{sus}$ is impressed, the deposition is continued only at the pixels where the nuclei have been formed, whereby the deposition amount is controlled. At the pixels where the nuclei have not been formed, impression of the data sustaining pulse voltage $V_{sus}$ does not cause deposition, and non-colored state is maintained there. This is clear also from the description of FIG. 5.

The data sustaining pulse voltage $V_{sus}$ is selected to be a voltage between the keeping voltage $V_{ke}$ and the threshold voltage $V_{th}$, and satisfies the following conditional formula:

$$V_{sus}+V_{adress\text{-}col}<V_{th} \quad \text{(conditional formula 1)}$$

When the data sustaining pulse voltage $V_{sus}$ is increased beyond this value, deposition of silver by the impression of the data sustaining pulse voltage $V_{sus}$ takes place also at non-addressed pixels (pixels which must be kept in the non-colored state).

After the writing, the display can be memorized by opening or shortcircuiting both the column electrode and the row electrode. In addition, when an erasing voltage $-V_e$ is impressed on the row electrodes $R_1$, $R_2$, $R_3$, . . . at a predetermined timing so as to impress a plus voltage $V_e$ on each pixel, silver is dissolved, and erasure is performed thereby. Incidentally, the erasing voltage $V_e$ is set to be equal to or slighter lower than the erasing voltage $V_{ith}$ in FIG. 5 above. When the erasing voltage Ve exceeds the erasing voltage $V_{ith}$, coloring may occur.

As has been described above, by use of the data sustaining pulse voltage $V_{sus}$, the following effects can be obtained. First, the selection between coloring and non-coloring of pixel depends only on the data addressing pulse, and the amount of silver deposited can be controlled by the data sustaining period ($T_{sus}$) for which the sustaining pulse voltage is impressed, so that the data addressing period ($T_{address}$) can be shortened. The image rewriting time ($T_{ref}$) is determined by the data addressing period ($T_{address}$), the number N of row electrodes, and the data sustaining period ($T_{sus}$) as shown in the following formula (2), so that shortening of the data addressing period ($T_{address}$) is very effective. In the case of the above-mentioned driving method, the data addressing period ($T_{address}$) could be set to be not more than 10 msec.

$$T_{ref}=T_{adress} \times N + T_{sus} \quad (2)$$

Besides, also as to the problem of nonuniformity such that the pixel coloring density increases according to the scanning order, the above-mentioned driving method is effective. In the above driving method, control of the silver deposition amount is conducted by impressing the data sustaining pulse voltage, so that the voltage of the address pulse can be made comparatively low and the impressing time can be shortened. Therefore, the amount of silver nuclei deposited by the address pulse is reduced, attended by a reduction in nonuniformity of growth.

Figure 8A:
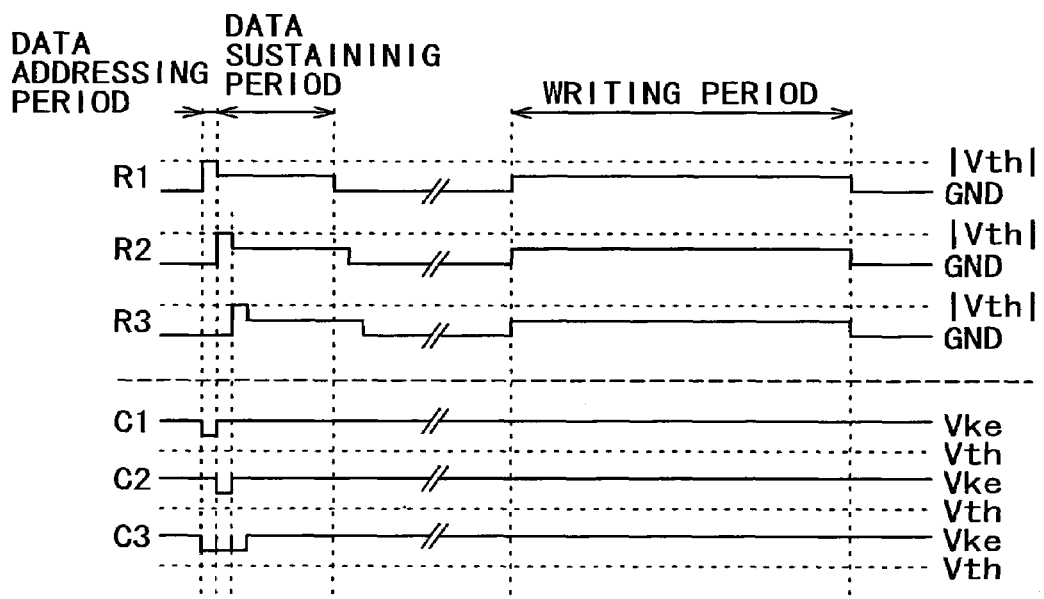
FIGS. 8A and 8B are waveform diagrams showing one example of the driving voltage waveform in the case where a data sustaining pulse and a writing pulse are separated.
Figure 8B:
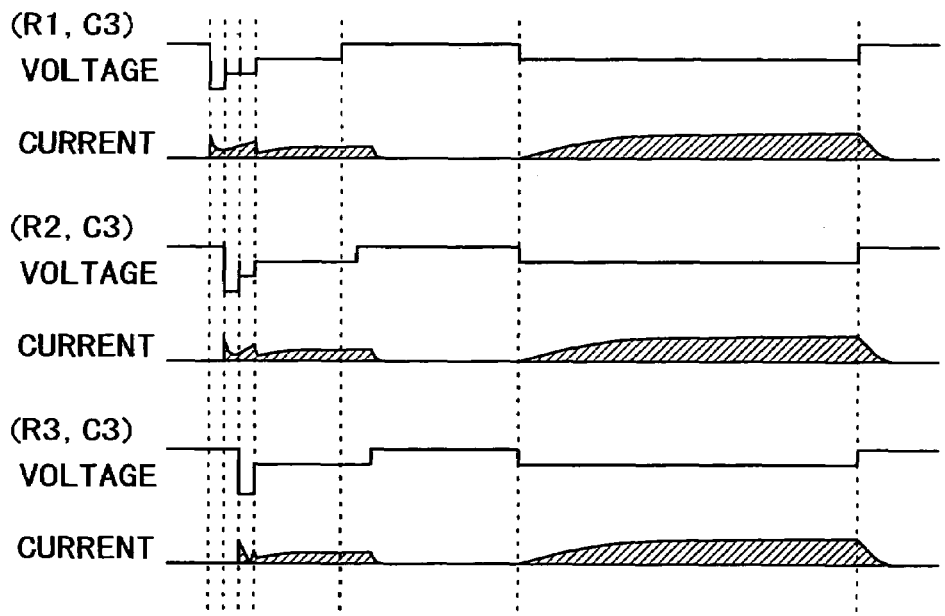
Figure 9B:
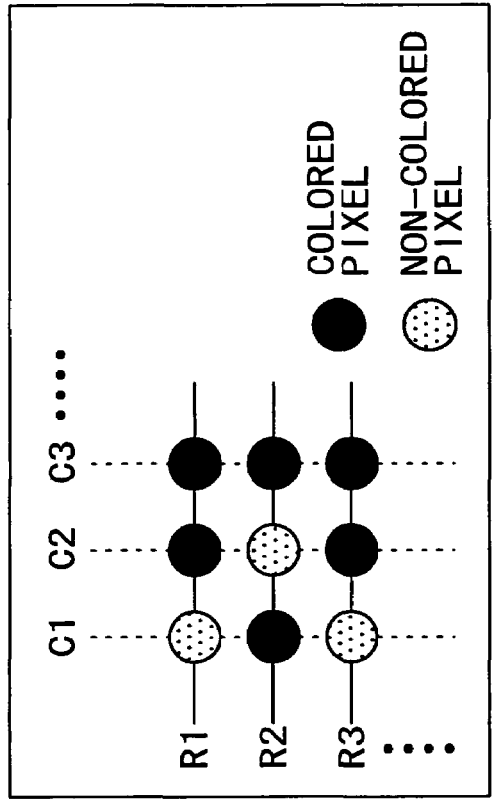
FIGS. 9A and 9B are schematic diagrams showing the manner of display in the case where the driving method shown in FIGS. 8A and 8B is conducted.
Figure 9A:
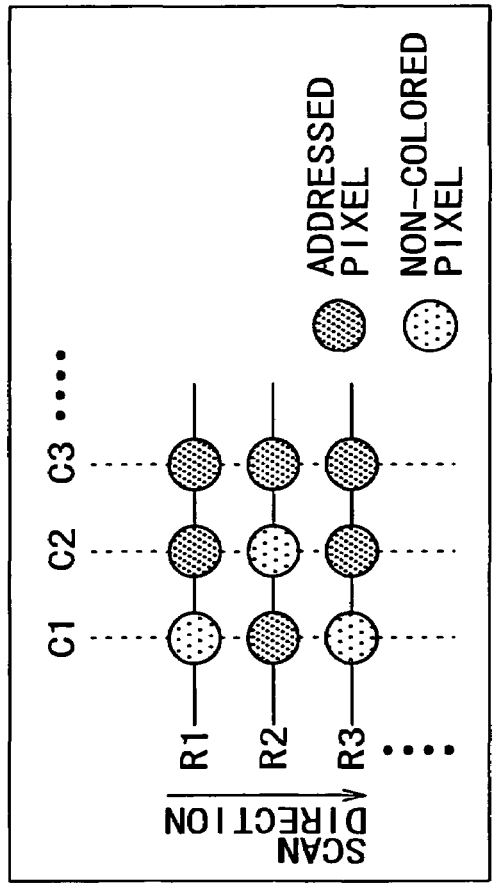

As an example of application of the above driving method, first, the data sustaining pulse and the writing pulse can be separated from each other, as shown in FIG. 8A (driving sequence) and FIG. 8B (voltage impressed on the pixels ($R_1$, $C_3$), ($R_2$, $C_3$), ($R_3$, $C_3$) and current). In this case, at the addressing time, a certain degree of coloring proceeds at the selected pixels as shown in FIG. 9A, and the coloring is completed by impression of the writing pulse as shown in FIG. 9B. The rewriting time in this case is induced from the following formula:

$$T_{ref}=T_{adress} \times N + T_{sus} + T_{write} \quad (3)$$

where $T_{write}$ is the writing time.

Figure 10:
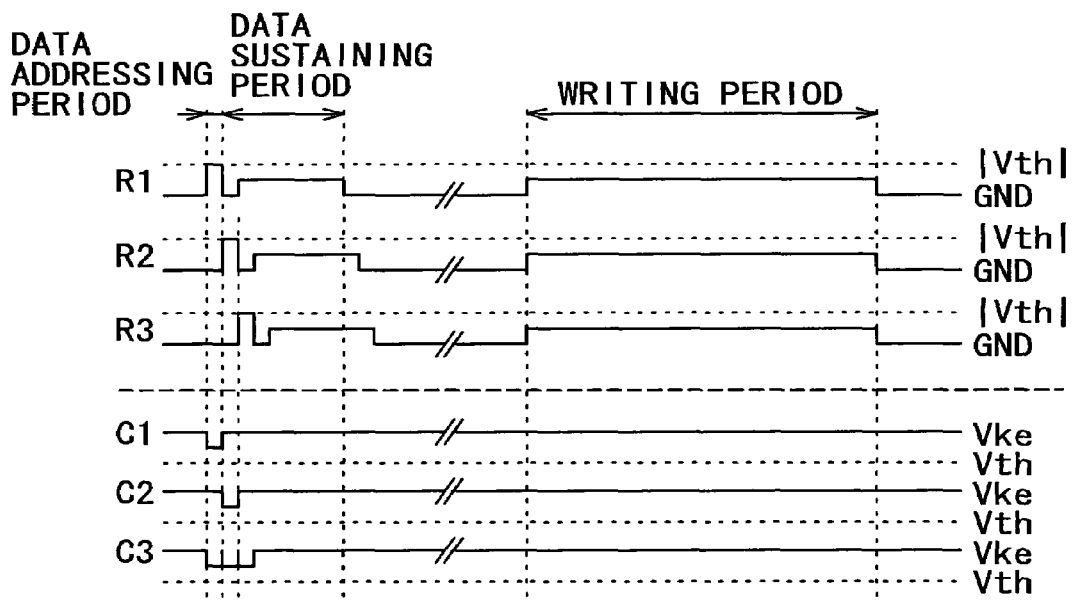
FIG. 10 is a waveform diagram showing one example of the driving voltage waveform in the case where the data sustaining pulse is continuously impressed at a fixed interval.
Figure 11:
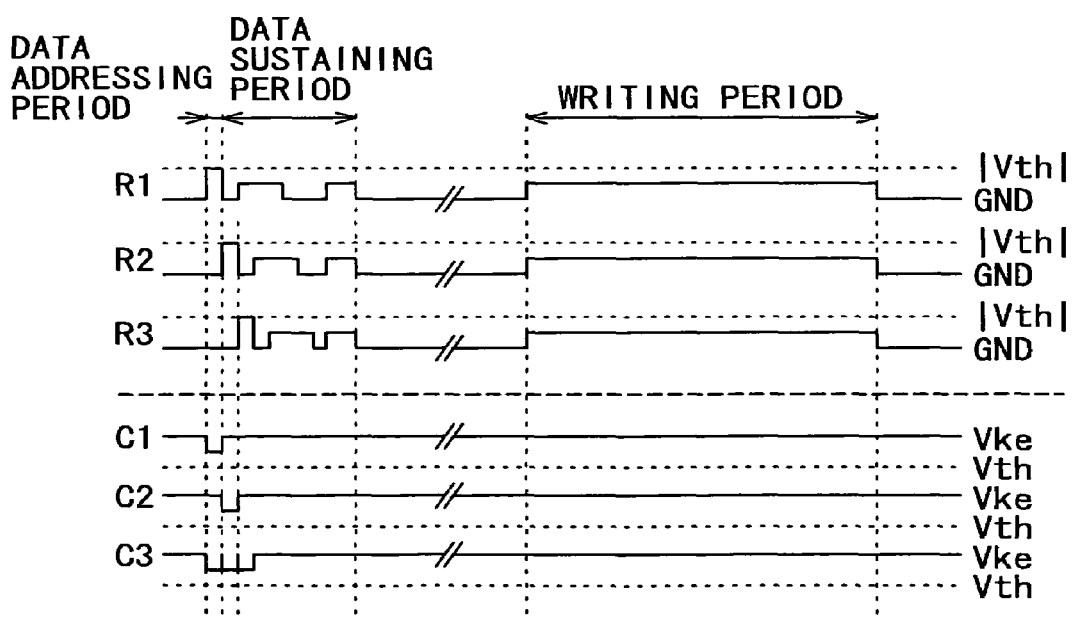
FIG. 11 is a waveform diagram showing one example of the driving voltage waveform in the case where the data sustaining pulse is continuously impressed at a fixed interval.

In addition, while the data sustaining pulse is impressed in succession to the addressing pulse in the above example, it is also possible, for example, to continuously impress the data sustaining pulse with a certain interval, as shown in FIG. 10. Alternatively, it is also possible to intermittently impress the data sustaining pulse, as shown in FIG. 11. With these variations, it is possible to provide a degree of freedom in circuit designing.

Figure 13A:
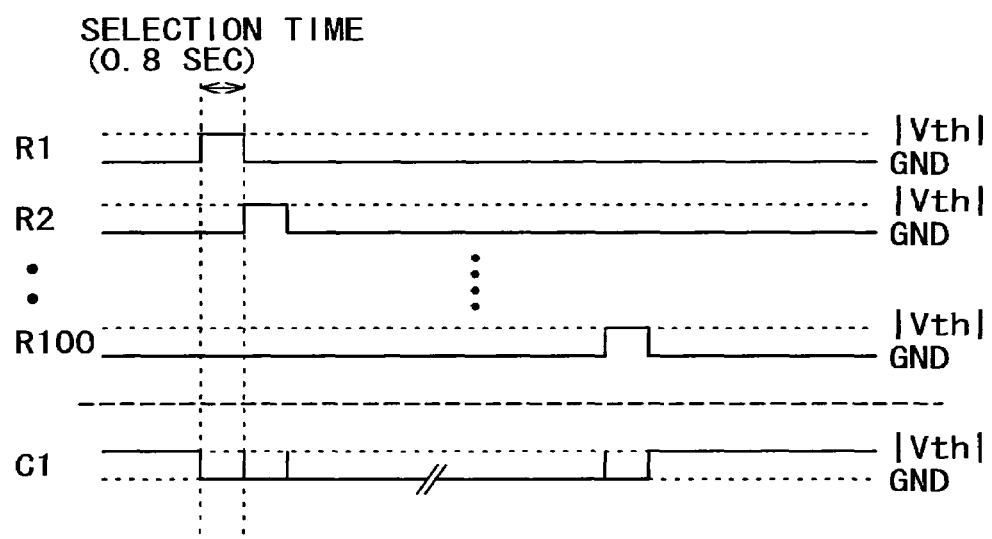
FIGS. 13A and 13B are waveform diagrams showing the driving method in the case where the display apparatus shown in FIG. 12 is driven by the related art.

Next, taking an actual panel operation as an example, the effects of the present invention will be described. Here, a panel having 100 lines of row electrodes and 100 lines of column electrodes as shown in FIG. 12 is taken as an example. In the case of the related art, for shortening the screen rewriting time, a driving method as shown in FIG. 13A (voltages impressed on row electrodes and column electrodes) and FIG. 13B (voltages impressed on pixels and current waveform) is adopted. On the other hand, in the driving method according to the present invention, a method as shown in FIG. 14A (voltages impressed on row electrodes and column electrodes) and FIG. 14B (voltage impressed on pixels and current waveform) is adopted.

Figure 13B:
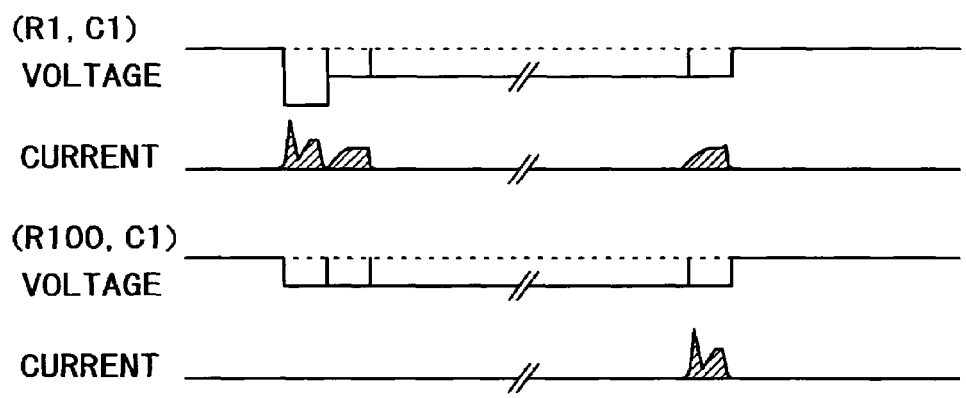
Figure 14A:
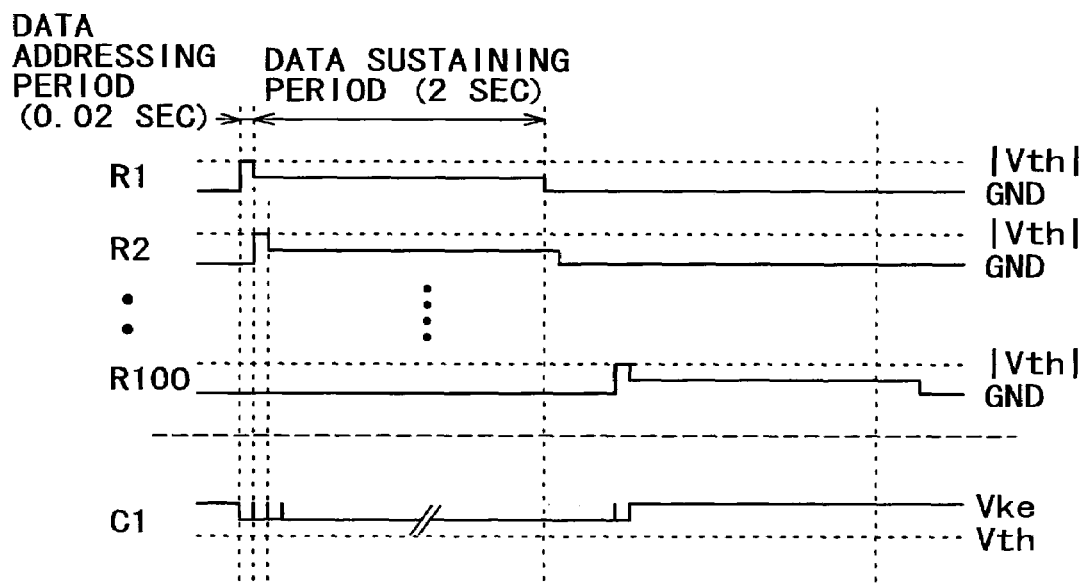
FIGS. 14A and 14B are waveform diagrams showing the driving method in the case where the display apparatus shown in FIG. 12 is driven by the present invention.
Figure 14B:
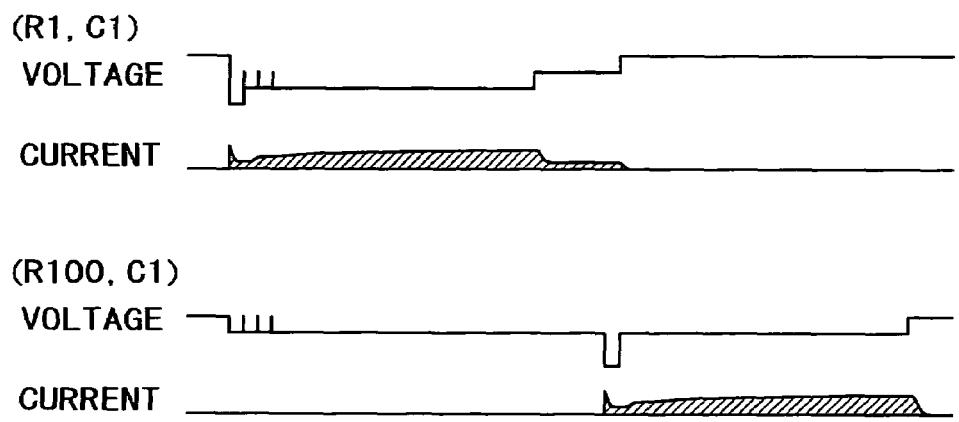

Here, first, the screen rewriting time in the case of the related art is one selection time (0.8 sec)×the number of lines (100)=80 sec, as is clear from FIGS. 13A and 13B, whereas the rewriting time according to the present invention is one addressing period (0.02 sec)×the number of lines (100)+the data sustaining period (2 sec)=4 sec, as is seen from FIGS. 14A and 14B. Therefore, as to the screen rewriting time, the driving method of the present invention is by far advantageous.

Figures 15A, 15B:
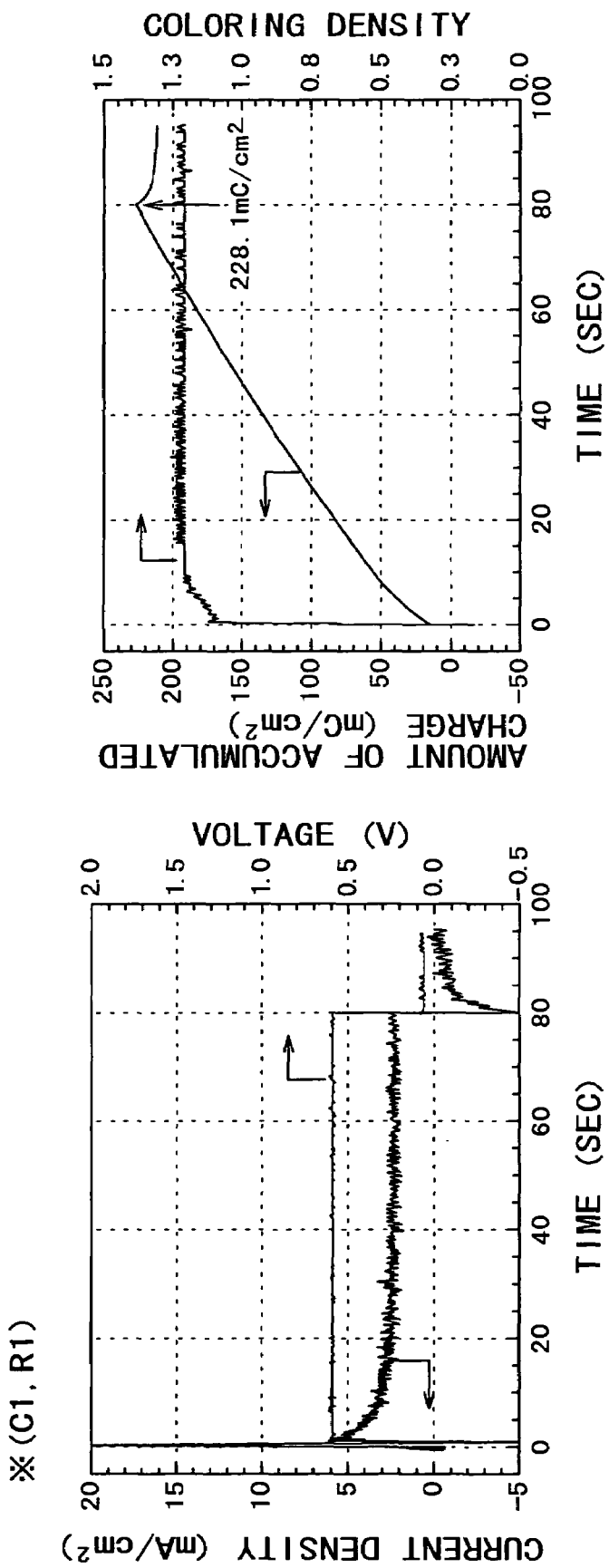
FIG. 15A is a characteristic diagram showing current and voltage values against time.
FIG. 15B is a characteristic diagram showing the amount of accumulated electric charge and coloration density against time, in a pixel ($R_1$, $C_1$) in the case where the driving method according to the related art shown in FIG. 13 is adopted.
Figure 17A:
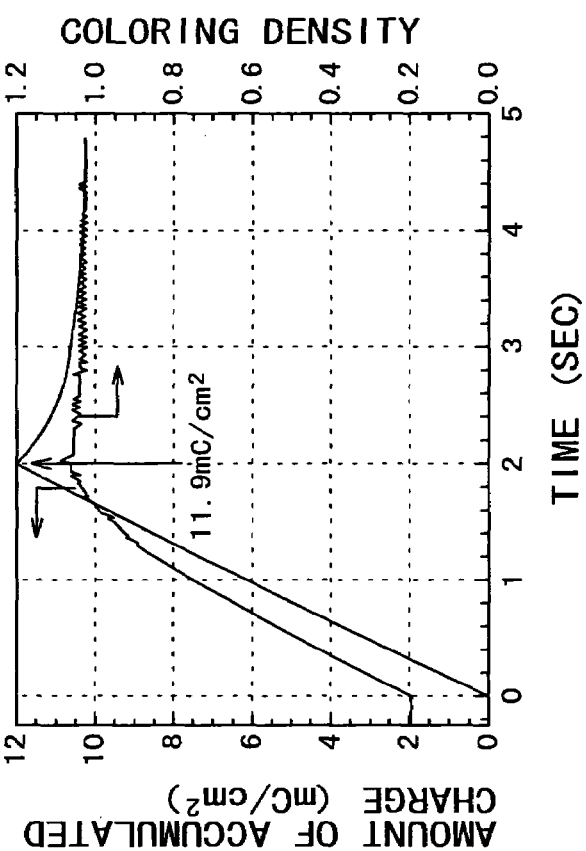
FIG. 17A is a characteristic diagram showing current and voltage values against time.
Figure 17B:
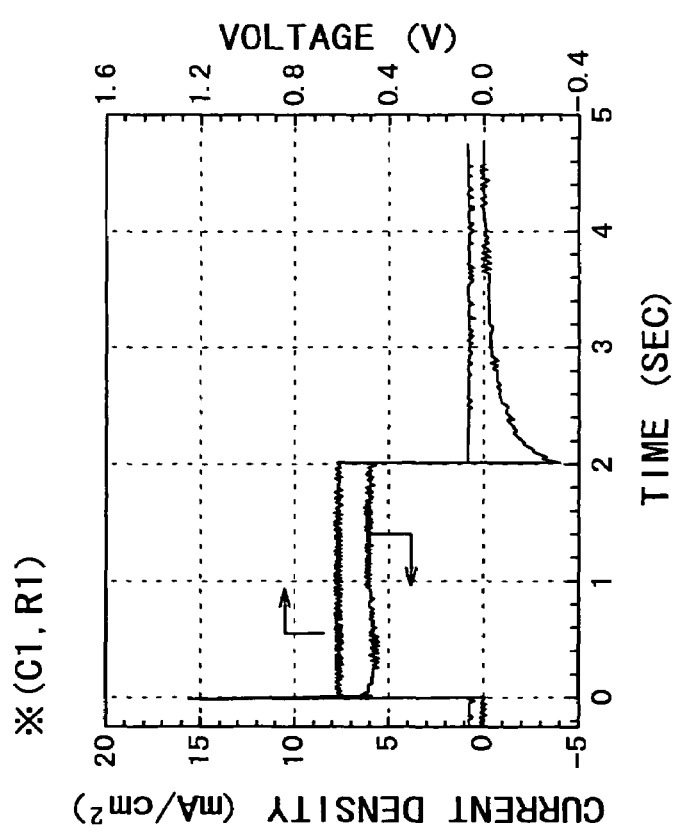
FIG. 17B is a characteristic diagram showing the amount of accumulated electric charge and coloration density against time, in a pixel ($R_1$, $C_1$) in the case where the driving method according to the present invention shown in FIGS. 14A and 14B is adopted.
Figure 18B:
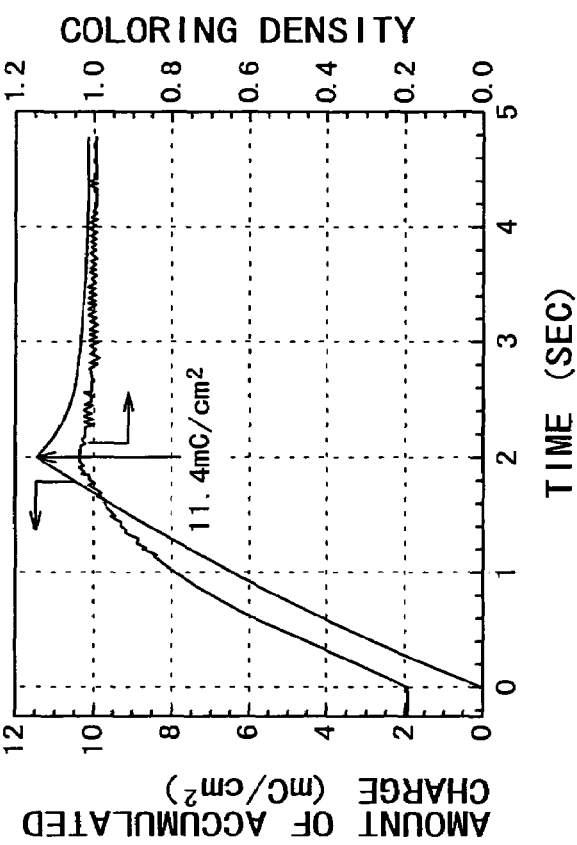
FIG. 18B is a characteristic diagram showing the amount of accumulated electric charge and coloration density, in a pixel ($R_{100}$, $C_{100}$) in the case where the driving method according to the present invention shown in FIGS. 14A and 14B is adopted.
Figure 18A:
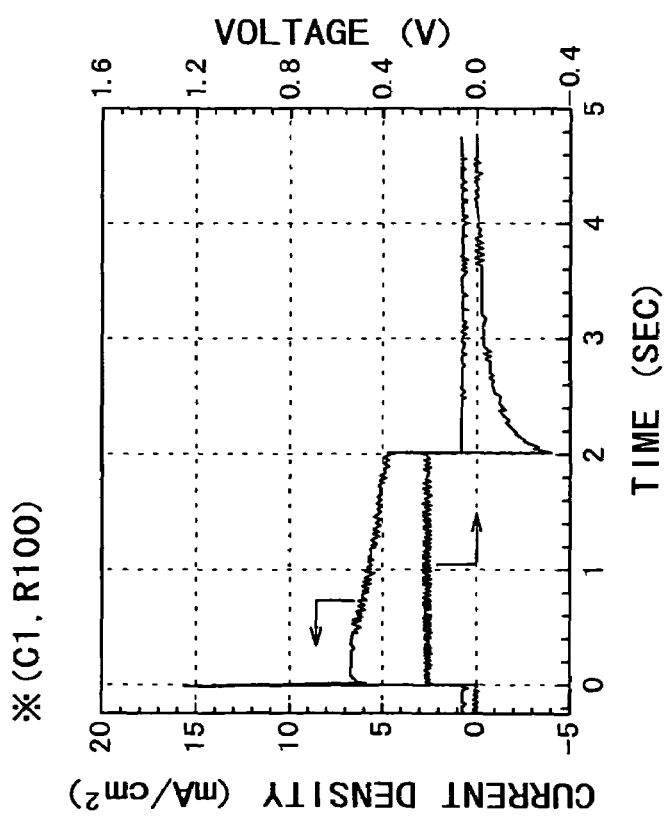
FIG. 18A is a characteristic diagram showing current and voltage values against time.
Figure 19:
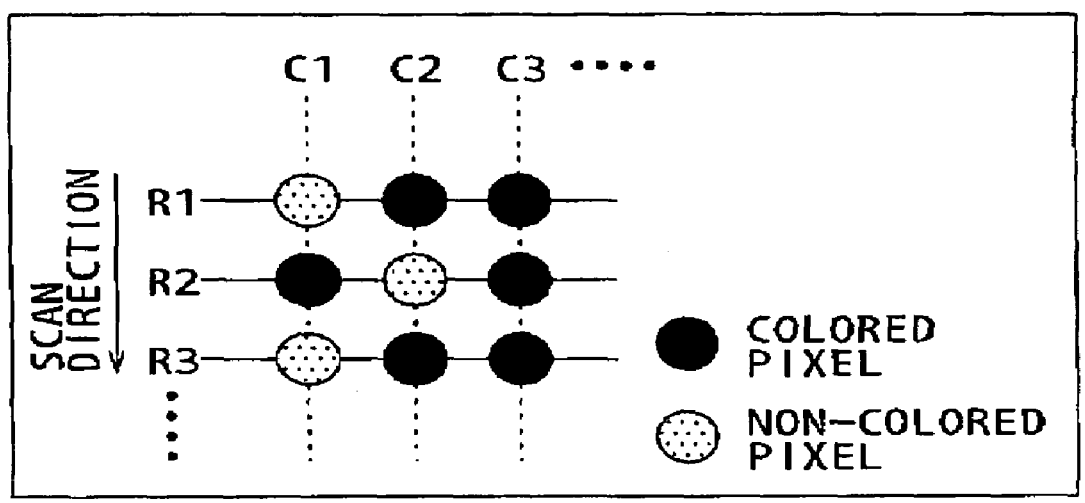
FIG. 19 is a schematic diagram showing one example of monochromic display using 3×3 pixels.

In addition, as to the nonuniformity of coloring density, the amount of electric charges accumulated in each pixel was empirically determined, to give the results as shown in FIGS. 15A to 18B. Incidentally, FIG. 15A shows the current and voltage values against time at pixel ($R_1$, $C_1$) in the case where the driving method according to the related art shown in FIGS. 13A and 13B is adopted, and FIG. 15B shows the amount of electric charges accumulated and the coloring density against time. FIG. 16A shows the current and voltage values against time at pixel ($R_{100}$, $C_1$) in the case where the driving method according to the related art shown in FIGS. 13A and 13B is adopted, and FIG. 16B shows the amount of electric charges accumulated and the coloring density against time. FIG. 17A shows the current and voltage values against time at pixel ($R_1$, $C_1$) in the case where the driving method according to the present invention shown in FIGS. 14A and 14B is adopted, and FIG. 17B shows the amount of electric charges accumulated and the coloring density against time. FIG. 18A shows the current and voltage values against time at pixel ($R_{100}$, $C_1$) in the case where the driving method according to the present invention shown in FIGS. 14A and 14B is adopted, and FIG. 18 shows the amount of electric charges accumulated and the coloring density against time.

Based on the above, the difference in writing amount in the case where all the pixels on the column line are colored will be discussed. First, from FIGS. 15A and 16B, in the driving method according to the related art, the amount of accumulated charges $Q(R_1, C_1)$ at the pixel $(R_1, C_1)$ and the amount of accumulated charges $Q(R_{100}, C_1)$ at the pixel $(R_{100}, C_1)$ are respectively $Q(R_1, C_1)=221.8$ mC/cm$^2$ and $Q(R_{100}, C_1)=10.5$ mC/cm$^2$, so that the difference in the amount of accumulated charges is by a factor of about 21.

On the other hand, in the driving method according to the present invention, the amount of accumulated charges $Q(R_1, C_1)$ at the pixel $(R_1, C_1)$ and the amount of accumulated charges $Q(R_{100}, C_1)$ at the pixel $(R_{100}, C_1)$ are respectively $Q(R_1, C_1)=11.9$ mC/cm$^2$ and $Q(R_{100}, C_1)=11.4$ mC/cm$^2$, so that the difference in the amount of accumulated charges is by a facto of about 1.04. Therefore, it is seen that, according to the present invention, the nonuniformity of density is improved remarkably.

INDUSTRIAL APPLICABILITY

As is clear from the above description, according to the present invention, it is possible to largely reduce the nonuniformity of images formed. In addition, since addressing can be performed at high speed, it is possible to shorten the time required for display.

The invention claimed is:

1. A method of driving a display apparatus for displaying an image by deposition and dissolution of a metal, the deposition and dissolution being controlled at each pixel by impressing a voltage on the pixels by row electrodes and column electrodes which are disposed in a matrix, wherein a voltage equal to or more than a threshold voltage Vth is selectively impressed on predetermined pixels by superposing an address pulse voltage Vaddress-row, for said row electrodes and an address voltage Vaddress-col, for said column electrodes on each other in order to cause deposition of the metal to begin, the voltage equal to or more than the threshold being only momentarily applied to selected pixels to ensure that deposition of the metal begins only at certain selected pixels without exhausting an available amount of metal for deposition during application of the voltage equal to or more than the threshold, and a data sustaining pulse voltage Vsus satisfying the relationship of the following formula (1):

$$\text{Vsus+Vaddress-col} < \text{Vth} \quad (1)$$

is thereafter impressed on said row electrodes immediately after said address pulse voltage Vaddress-row, in order to cause additional deposition of the metal to continue.

2. The method of driving a display apparatus as set forth in claim 1, wherein after nuclei of crystal are formed in predetermined pixel by said address driving, the amount of growth of said nuclei in the selected pixels is controlled by the length of time said data sustaining pulse voltage is imposed.

3. The method of driving a display apparatus as set forth in claim 1, wherein said data sustaining pulse voltage is impressed continuously during the sustaining period until the desired amount of metal deposition occurs in the selected pixel.

4. The method of driving a display apparatus as set forth in claim 1, wherein said data sustaining pulse voltage is impressed intermittently during the sustaining period until the desired amount of metal deposition occurs in the selected pixel.

5. The method of driving a display apparatus as set forth in claim 1, wherein after said data sustaining pulse voltage is impressed on a line sequence basis, a write pulse voltage is impressed on each row of the matrix.

6. The method of driving a display apparatus as set forth in claim 1, wherein rewriting of the image is conducted in addition to a series of operations for impressing an erasing pulse voltage.

7. The method of driving a display apparatus as set forth in claim 1, wherein said data sustaining pulse voltage Vsus is a non-zero value.

8. The method of driving a display apparatus as set forth in claim 1, wherein the display apparatus includes a polymer electrolyte layer in which said metal is deposited, and said polymer electrolyte layer includes a pigment in the amount of 1-20% by weight, and is 10 to 200 μm thick.

9. The method of driving a display apparatus as set forth in claim 1, wherein the display apparatus includes a polymer electrolyte layer in which said metal is deposited, and said polymer electrolyte layer includes a pigment in the amount of 5-10% by weight, and is 10 to 50 μm thick.

10. The method of driving a display apparatus as set forth in claim 1, wherein the time it takes to write a new image to the display is determined by the following formula (2):

$$T_{ref}=T_{address} \times N + T_{sus} \quad (2)$$

where $T_{ref}$ is the total image rewriting time, $T_{address}$ is the data addressing period, N is the number of rows of electrodes in the matrix, and $T_{sus}$ is the data sustaining period.

11. The method of driving a display apparatus as set forth in claim 5, wherein the time it takes to write a new image to the display is determined by the following formula (3):

$$T_{ref}=T_{address} \times N + T_{sus} + T_{write} \quad (3)$$

where $T_{ref}$ is the is the total image rewriting time, $T_{address}$ is the data addressing period, N is the number of rows of electrodes in the matrix, $T_{sus}$ is the data sustaining period, and $T_{write}$ is the writing time.

* * * * *